United States Patent [19]

Zulauf et al.

[11] Patent Number: 4,607,762
[45] Date of Patent: Aug. 26, 1986

[54] BOTTLE WITH DOSING DEVICE

[75] Inventors: Karlheinz Zulauf, Höchst-Hassenroth; Franz Steigerwald, Griesheim, both of Fed. Rep. of Germany

[73] Assignee: Wella AG, Darmstadt, Fed. Rep. of Germany

[21] Appl. No.: 462,933

[22] Filed: Jan. 31, 1983

[30] Foreign Application Priority Data

Feb. 6, 1982 [DE] Fed. Rep. of Germany ....... 3204118

[51] Int. Cl.[4] ............................................. B65D 37/00
[52] U.S. Cl. ...................................... 222/48; 222/109; 222/207; 222/212; 222/521; 222/442
[58] Field of Search ................ 222/109, 207, 211–212, 222/442, 425, 424.5, 571, 520–521, 519, 46–48, 41, 43

[56] References Cited

U.S. PATENT DOCUMENTS

| 2,669,740 | 2/1954 | Main | 222/521 X |
| 3,059,816 | 10/1962 | Goldstein | 222/109 |
| 3,141,579 | 7/1964 | Medlock | 222/207 |
| 4,077,547 | 3/1978 | Donoghue | 222/207 |
| 4,143,794 | 3/1979 | Stratford et al. | 222/207 X |
| 4,143,797 | 3/1979 | Reed | 222/207 |
| 4,234,103 | 11/1980 | Strobl, Jr. et al. | 222/212 X |
| 4,314,657 | 2/1982 | Perakis et al. | 222/442 X |
| 4,420,100 | 12/1983 | Mueller | 222/207 X |

FOREIGN PATENT DOCUMENTS 1113774 1/1962 France ................................. 222/521

Primary Examiner—Charles A. Marmor
Attorney, Agent, or Firm—Michael J. Striker

[57] ABSTRACT

A dosaging device for dispensing defined amounts of a liquid being contained in a bottle with a squeezable wall. A valve is disposed between the content of the bottle and the dosaging container which can be selectively opened or closed by turning a gripping piece. The openings for feeding the bottle content into the dosage container are arranged in a specific manner with respect to the pouring orifice. An oblique trough which encompasses the pouring orifice reduces the still remaining liquid in the area of the pouring orifice back into the dosaging container, after the pouring. Baffle ribs are mounted on the inner side of the lid which covers the dosage container to the outside and which contains the pouring orifice in such a manner that they limit the liquid film formed by the impact of the liquid streams on the inside of the lid in direction of the opening provided for pouring.

23 Claims, 10 Drawing Figures

4,607,762

BOTTLE WITH DOSING DEVICE

FIELD OF THE INVENTION

The invention relates to a bottle made of flexible material with a dosing device for dispensing predetermined amounts of liquid contained in the bottle, wherein the supply container is connected with a measuring container and in which an intermediary member is provided which prevents the dispensing of the liquid from the supply container during emptying of the measuring container.

BACKGROUND OF THE INVENTION

Numerous different types of dosing devices and bottles with dosing devices are already known. For example, dosing devices are known wherein the liquid to be dispensed is fed into the dosing device by squeezing the container. Partially, these dosing devices are integrated as a part of the packaging in the container neck and are closed by an additional closing device. This closing device must be removed before the dosing process and after removing the liquid from the dosing device it must again be mounted thereon. Furthermore, the dosing process is be poorly controlled, due to the fact that the dosing device is disposed within the container neck and cannot be visibly controlled. A variation of the dosage is hardly possible.

Other dosing devices are not meant to be a part of the package and must be mounted on the container at a later time. However, these systems do not offer the possibility to again close the package air tight after mounting the dosaging device. Thus, the liquid in the container is constantly in contact with the outer air.

A common disadvantage of both types resides in that it is not possible to close the connecting conduit between the dosaging space and the liquid container before removing liquid from the dosaging device, so that, mainly in full containers, liquid can flow uncontrollably through the uptake and into the dosaging space due to accidental shaking or squeezing movements. Thereby, the dosage loses its exactness.

SUMMARY OF THE INVENTION

It is an object of the present invention by combining individual parts, partly known, to provide a particularly easy to use embodiment, wherein the aforementioned disadvantages are eliminated.

This object of the invention is obtained by a container with a dosing device of the aforementioned type in accordance with the invention by the stated technical features in the characterizing clause of the claim.

Further modifications and designs of the invention are characterized in the subclaims and will be described in conjunction with the exemplified embodiments and the partially simplified drawings. The same parts are designated with the same reference numerals in the drawings, and all unnecessary details for understanding the invention have been omitted.

DESCRIPTION OF THE PREFERRED EMBODIMENTS

Figure 1:
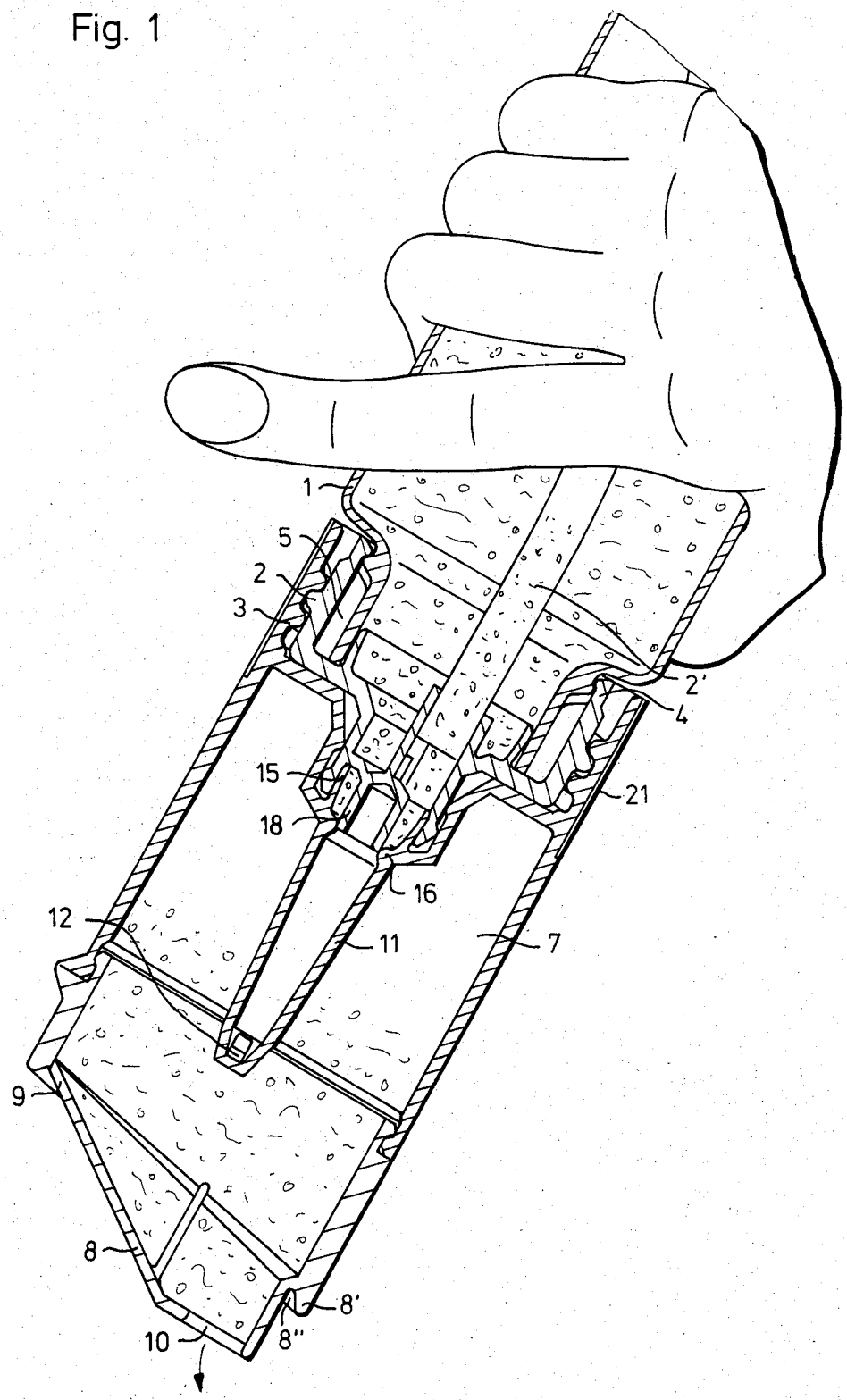
FIG. 1 a longitudinal section of a container with a dosaging device with a closed valve in accordance with the invention.
Figure 2:
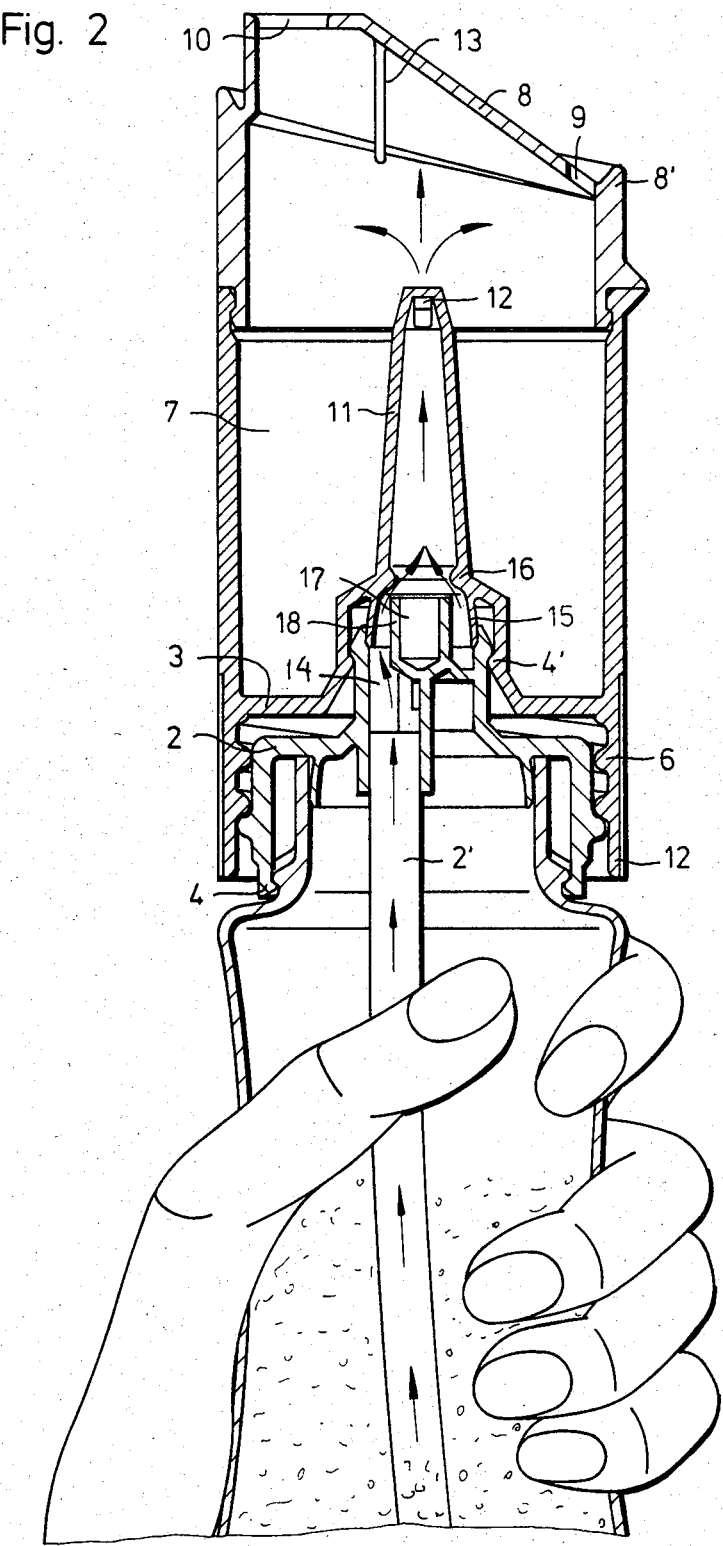
FIG. 2 a longitudinal section of the container illustrated in FIG. 1 with the dosing device with an opened valve.
Figure 3:
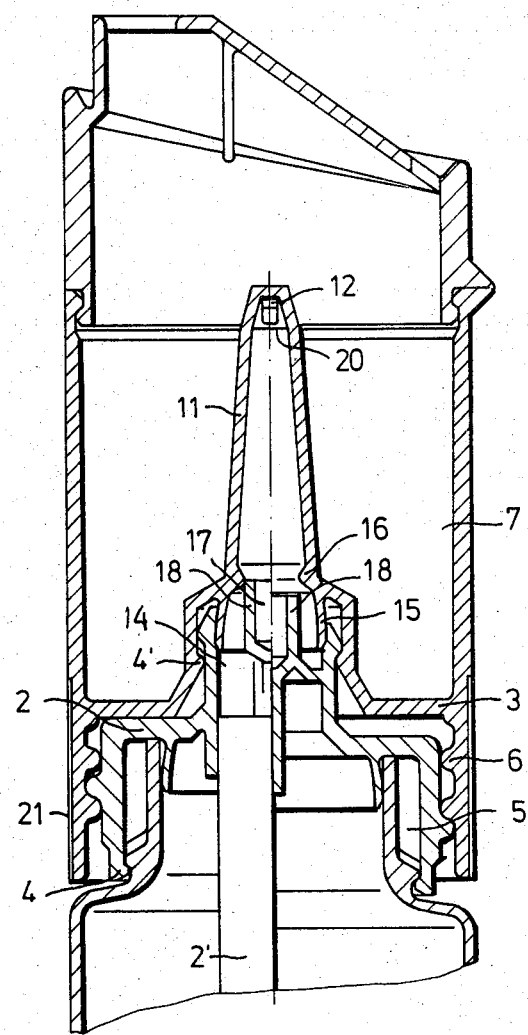
FIG. 3 the dosing device illustrated in FIG. 1, at the right with opened valve and at the left with closed valve in longitudinal section.
Figure 4:
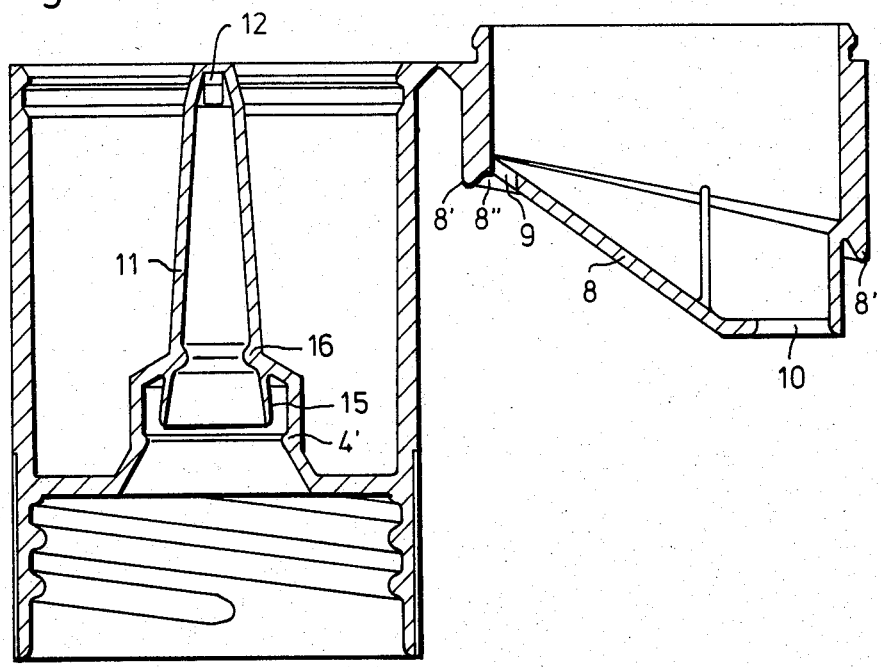
FIG. 4 the dosing device illustrated in FIGS. 1 and 2 with folded open lid in longitudinal section.
Figure 5:
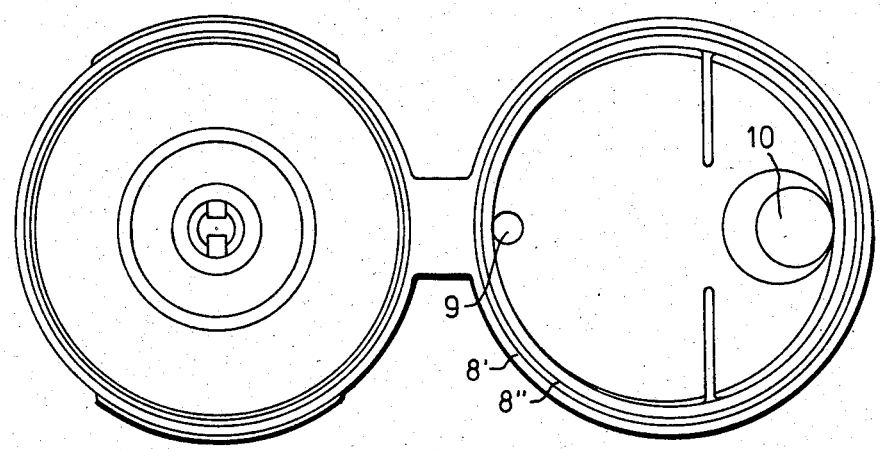
FIG. 5 a plan view on the dosing device and on the inside of the lid illustrated in FIG. 4.
Figure 7:
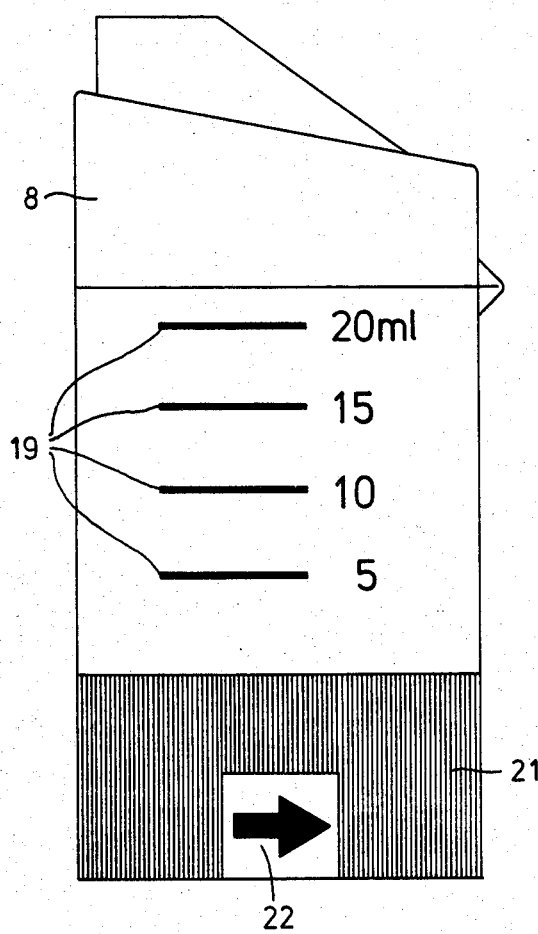
FIG. 7 a side view of the dosing device being mountable on the container.
Figure 6:
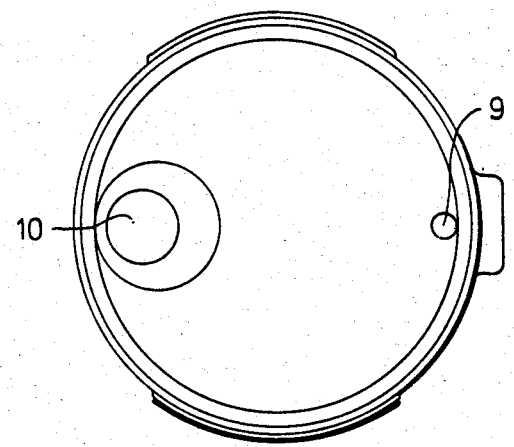
FIG. 6 a plan view on the outside of the lid illustrated in FIGS. 4 and 5.
Figure 9:
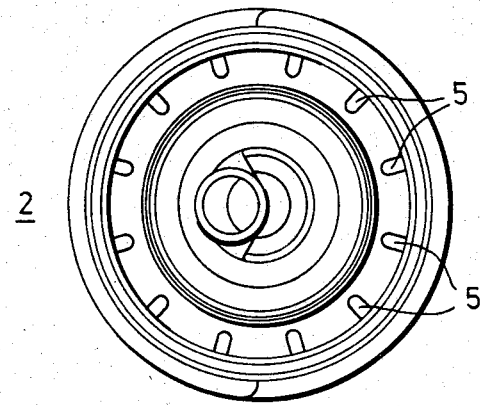
FIG. 9 the base illustrated in FIG. 8, seen from below.
Figure 8:
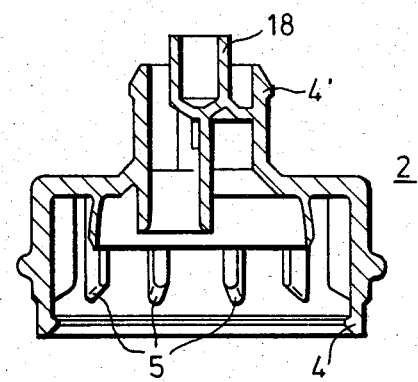
FIG. 8 as a construction detail, the base of the dosing device illustrated in FIGS. 1 and 2.
Figure 10:
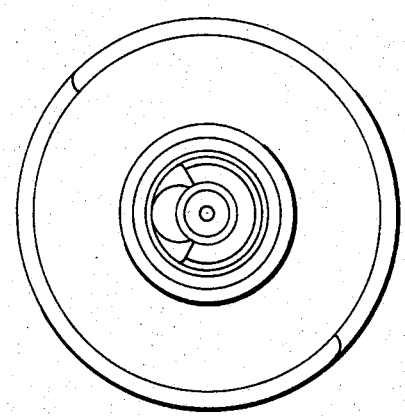
FIG. 10 the base illustrated in FIG. 8, seen from above.

FIGS. 1 and 2 show the handling of the invention; while FIGS. 3 to 10 clearly show the construction design of the individual structural elements.

A container 1 made of a squeezable material serves as a package for dispensing a liquid has a neck upon which dosing device is mounted and a bottom. The dosing device simultaneously serves as a closure and may be a part of the package and advantageously consists of a base 2 with an excentrically inserted conduit 2' extending to the container bottom and an outer part 3 made of translucent or transparent plastic. The base 2 is made from a masked colored plastic and is fixedly connected with the bottle neck by means of a first catch lock connection 4. Ribs 5 which are peripherally mounted on an inner diameter of the base 2 engage with corresponding ribs on the bottle neck and thereby secure the base 2 against turning. The outer part 3 covers the base 2 and is rotatably connected thereto by means of a thread 6 and a second catch lock connection 4'.

The dosing outer part 3 has an upper end disposed opposite the thread area and is closed by a lid 8 formed as a hinged lid tipstretched on the outer part 3. The lid 8 has an outer face which extends oblique to the longitudinal axis of dosage cup 7 and a spout 10 and one diametrically opposed opening 9 are so arranged that the spout 10 for pouring the liquid is disposed at a zone of the lid 8 farthest removed from the container 1, while the opposed opening 9 for suctioning air is located at a zone closest to the container. Lid 8 has on its outer face an annular shoulder 8' protruding outwardly in an axial direction encompassing the spout 10 and opening 9 in the lid. The opening 9 is disposed in a lowermost area of a trough 8'' formed by the annular shoulder 8' and outwardly limiting the same.

A slightly conically extending dosaging tube 11 is centrically disposed within the dosing space and has an upper end at which two opposite dispensing orifices 12 are provided. The dispensing orifices are offset by an angle of 90° with respect to the spout 10 which serves to pour the dosed liquid. This constructive measure prevents one of the discharging liquid streams from the upper end of the dosaging tube 11 from hitting spout 10 during the dosing process, whereby liquid would be dispensed to the outside in an undesired manner. In addition, two lateral baffle ribs 13 are mounted on an inner side of lid 8 parallel with respect to the dispensing orifices 12 in order to limit a liquid film from forming on the head plate due to the impact of the streams in the direction of the spout 10. The sealing of the outer part 3 with respect to the base 2 is performed in the closed condition by means of a sealing lip 15 which extends into an upper opening 14 of the inner part and also by a valve seat 16 disposed on an inner bore of the dosaging tube 11 which sealingly engages on a corresponding sealing socket 18 of the base 2. In this condition, no liquid can flow from the bottle into the dosing device.

If the liquid should be removed in a dosed manner one turns the outer part 3 like with a normal screw lock. By this turning the outer part 3 is displaced axially upward with respect to the base 2 by means of the thread 6. The axial movement is limited by corresponding abutment shoulders of the base 2 and the outer part 3. In this end position only one of the two sealing elements is effective, that is, only the sealing lip 15 on tube socket 18 which prevents liquid to enter between the outer part 3 and the base 2. The valve seat 16 which is provided in the lower area of dosing tube 11 is above the sealing socket 18 and thereby the connection between the container 1 and the dosage cup 7 is opened.

Due to the axial displacement between the outer part 3 and the base 2 the lower area of the colored, previously covered base 2 is visible at a height of about 2 mm and therefore signals the optical open position of the dosing device.

When an excess pressure is generated, for example, by squeezing the container 1, the liquid ascends in the conduit 2' and flows over the base into the dosaging tube 11 of the outer part 3 and enters through the two dispensing orifices 12 into the dosage cup 7. The dosage quantity can now be determined by means of a scale 19. The maximum possible liquid level is predetermined by the lower edge 20 of the two dispensing orifices 12 of the dosage tube 11. Liquid which remains in the dosage cup above these openings is suctioned back into the container due to the vacuum created therein by the squeezing movements.

The head space volume of the dosage cup 7 which is above this maximum possible fill level must be somewhat larger than the displaceable liquid amount from the container by the squeeze movement. This assures that due to an eventual overdose no liquid discharges from the spout 10 of the dosing device.

When the dosing process is concluded, the container or the bottle is again closed by turning the outer part 3 and the liquid is removed from the dosage cup 7 by means of shaking or pouring. This subsequent closing is advantageous in that liquid cannot flow subsequently and uncontrollably into the dosing device while removing liquid therefrom.

For improving the gripping capacity, the lower part of the outer part 3 facing the container is designed as a rotatably mounted grip 21 with grooves distributed over the circumference thereof. The height of the grooves corresponds to about the height of the base 2. However, the grooves are interrupted for three times around the circumference, so that for clarification of the direction of the opening movement additional markings in form of elevated arrows are mounted.

The aforementioned described embodiment is particularly characterized by the following advantages 1. It is easy to use by a simple handling and has excellent operating safety.

2. It is easy to use, because after finishing the dispensing process the present remaining liquid in the area of the spout 10 does not flow to the outside of the dosing device or onto the hand of the user, but is fed back into the inside; consequently, the closing device is very well adapted for agressive or strong coloring liquids, for example, concentrated hair coloring.

3. The danger of nonuseability due to permanent bonding is safely eliminated, because a locking device with only a small engagement face is mounted between the supply container and the dosage space; therefore, if bonding should occur only a relatively low force is required for opening.

4. A self-cleaning of the sealing faces during the opening and closing movement is obtained due to the specific manner of the opening and closing movement.

5. A very accurate dosage is assured by means of simple constructive but very effective measures.

We claim:

1. A dosing and dispensing device for fluids formed as a closure for a flexible container, comprising:

a base fixable on said container, said base having on its inside inwardly protruding ribs which coact with cams on a neck of said container to prevent turning of said base relative to said container;

an outer portion rotatably mounted on said base and including a calibrated dosage cup having an end and a plurality of calibrations;

a dosage tube positioned in said dosage cup and having a dispensing orifice for feeding liquid into said calibrated dosage cup, said orifice being located higher than the highest of said calibrations of said dosage cup;

a conduit for feeding the fluid to be dispensed from inside of the container to said dosage cup;

a valve positioned between said conduit and said dosage tube and including a valve element and a valve seat, one of said valve element and said valve seat being connected to said cup so that by turning said cup, said one of said valve element and said valve seat is moved in an axial direction to said outer portion to open or close said valve to pass or block the liquid into said dosage tube; and a lid covering said end of said dosage cup and having a spout at an end facing away from the container and one diametrically opposed opening, said base having a sealing socket, said tube being connected with said outer portion and having an inwardly protruding sealing shoulder at an end facing said valve which in the closed position of said valve sealingly engages said sealing socket and helically moves with respect to said sealing socket when opening said valve, said tube having a tube socket connected with said base, said valve seat at its side facing the container being provided with a sealing lip which engages with said tube socket concentrically with respect to said sealing socket and has a length dimensioned so that it also engages on said tube socket at said valve in a completely opened position.

2. A dosing and dispensing device in accordance with claim 1, wherein a grip is provided on said outer portion, one of said valve seat and valve element being connected within said grip.

3. A dosing and dispensing device in accordance with claim 1, wherein said base is mountable on the neck of the container by means of a catch lock connection and is formed as a cap having an outer thread, said outer part being formed with a corresponding inner thread and being connected with one of said valve seat and said valve element.

4. A dosing and dispensing device in accordance with claim 1, wherein said lid is tipstretched in form of a hinged cover.

5. A dosing and dispensing device in accordance with claim 4, wherein said dosage cup has a longitudinal axis, said lid having an outer face extending obliquely with respect to the longitudinal axis of said dosage cup, and said spout and said opening being arranged in such a manner that said spout, which is provided for pouring of the liquid, is disposed at a zone of said lid farthest removed from the container, while said opening, which is provided for suctioning air, is located at a zone closest to the container.

6. A dosing and dispensing device in accordance with claim 1, wherein said dosage cup has a transparent outer wall with said calibrations readable from the outside.

7. A dosing and dispensing device in accordance with claim 1, wherein said dispensing orifice of said tube is laterally offset by an angle of 90° with respect to said spout provided for pouring the liquid.

8. A dosing and dispensing device in accordance with claim 7, wherein said tube has two such diametrically opposed dispensing orifices which are disposed at a 90° offset angle with respect to said spout provided for pouring the liquid.

9. A dosing and dispensing device in accordance with claim 1, wherein said dosage cup has an outer wall, said tube being connected with said outer wall of said dosage cup.

10. A dosing and dispensing device in accordance with claim 1, wherein said lid supports on it inside at least one inwardly extending baffle rib so arrange that it limits a liquid film forming on the inside of said lid due to the impact of liquid stress in the direction of said spout provided for pouring the liquid.

11. A dosing and dispensing device in accordance with claim 5, wherein said lid supports on its outside an annular shoulder extending outwardly in axial direction encompassing said spout and said opening in said lid.

12. A dosing and dispensing device in accordance with claim 11, wherein said lid has a trough formed and limited by said annular shoulder, said opening being disposed in a deepest area of said trough.

13. A dosing and dispensing device in accordance with claim 1, wherein said base has an area facing the container and covered by said outer portion when said valve is in a closed position, but is visible when said valve is in an open position.

14. A dosing and dispensing device in accordance with claim 3, wherein said outer portion has an area facing the container and formed as a grip with a textured surface and has a marking in the direction of an open position.

15. A dosing and dispensing device in accordance with claim 3, and further comprising protruding shoulders which limit the turning of said outer portion relative to said base.

16. A dosing and dispensing device in accordance with claim 2, wherein said valve seat is connected within said grip.

17. A dosing and dispensing device in accordance with claim 3, wherein said dosage cup is connected with said valve seat.

18. A dosing and dispensing device in accordance with claim 17, wherein said lid supports on its inside two inwardly extending baffle ribs.

19. A dosing and dispensing device in accordance with claim 1, wherein said tube and said outer portion are unitary.

20. A dosing and dispensing device in accordance with claim 1, wherein said tube is conically shaped.

21. A dosing and dispensing device in accordance with claim 1, wherein said sealing lip is in the form of a cup.

22. A dosing and dispensing device in accordance with claim 13, wherein an inner part of said base is colored in such a way that said color is visible when said valve is open.

23. A dosing and dispensing device in accordance with claim 14, wherein said marking in the direction to an open position is an elevated arrow.

* * * * *